(12) United States Patent
Iwano et al.

(10) Patent No.: US 6,386,170 B1
(45) Date of Patent: May 14, 2002

(54) OIL SUPPLYING APPARATUS AND METHOD OF CONTROLLING THE SAME

(75) Inventors: Akira Iwano, Hekinan; Keiichi Yamashita, Kariya; Tetsuya Abe, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/588,726

(22) Filed: Jun. 7, 2000

(30) Foreign Application Priority Data

Jun. 8, 1999 (JP) .......................................... 11-160852
Oct. 27, 1999 (JP) .......................................... 11-305270
Apr. 28, 2000 (JP) ........................................ 2000-129801

(51) Int. Cl.$^7$ ................................................. F15B 1/00
(52) U.S. Cl. .............................. 123/196 R; 123/73 AD
(58) Field of Search ....................... 123/196 R, 73 AD; 184/6.22

(56) References Cited

U.S. PATENT DOCUMENTS 4,471,727 A * 9/1984 Odashima .............. 123/73 AD
5,568,842 A * 10/1996 Otani ........................ 184/6.22
5,662,188 A    9/1997 Ito et al.

* cited by examiner

*Primary Examiner*—Marguerite McMahon
(74) *Attorney, Agent, or Firm*—Harness, Dickey & Pierce, PLC

(57) ABSTRACT

An engine output shaft drives an engine driven pumps The engine driven pressurizes oil. An accumulator accumulates the pressurized oil. An electric motor drives a motor driven pump. When the engine rotates at low speed, both the engine driven pump and the motor driven pump supply oil to an oil chamber of a belt type continuously variable transmission. If it is required to enlarge a capacity of the oil chamber quickly, the pressurized oil in the accumulator is supplied to the motor driven pump. The motor driven pump further pressurizes the pressurized oil in the accumulator and supplies it into the oil chamber. It is possible to supply a sufficient amount of oil to the continuously variable transmission. Additionally, since the system may be constructed by using a small type engine driven pump, it is possible to improve fuel efficiency.

7 Claims, 7 Drawing Sheets

OIL SUPPLYING APPARATUS AND METHOD OF CONTROLLING THE SAME

CROSS REFERENCE TO RELATED APPLICATION

This application is based on Japanese Patent Application No. Hei 11-160852 filed on Jun. 08, 1999, No. Hei 11-305270 filed on Oct. 27, 1999 and No. 2000-129801 filed on Apr. 28, 2000 the contents of which are incorporated herein by reference.

BACKGROUND OF THE INVENTION

1. Field of the Invention

The present invention relates to a hybrid type oil supplying apparatus and a method for controlling the apparatus having an internal combustion engine (engine) driven pump and an electric motor driven pump. For instance, the apparatus of the present invention can be applied to a system for supplying oil for lubrication or an oil pressure control.

2. Description of Related Art

An engine driven pump is driven by an output shaft of the engine. An engine driven pump supplies an amount of oil depending on a revolution speed. For example, the amount of oil is little at a low revolution speed such as an idle operation. In a lubrication purpose, if oil is not supplied sufficiently, lubricated portions might be sticked. On the other hand, in an oil pressure control purpose, if oil is not supplied sufficiently, a responsive ability is lowered. For example, in a case that an oil pressure is used for varying a width of a pulley of a continuously variable transmission, it is required to supply oil quickly into a chamber for actuating the pulley. Here, if oil is not supplied sufficiently, a time lag is generated at a changing operation.

On the other hand, at a high revolution speed, the amount of oil might be excessive, the engine load increases wastefully, and fuel efficiency might be lowered.

SUMMARY OF THE INVENTION

It is an object of the present invention to provide an oil supply apparatus to avoid an insufficiency of oil at low revolution speed.

It is another object of the present invention to provide an oil supply apparatus to avoid an insufficiency of oil at low revolution speed and to improve fuel efficiency.

It is a further object of the present invention to provide an oil supply apparatus requiring a small space to install it.

It is a still further object of the present invention to provide an oil supply apparatus in which a required amount of oil can be supplied from a starting of an engine.

It is a yet further object of the present invention to provide a controlling method of an oil supply apparatus in which a required transmission ratio can be provided from a starting of the engine.

According to a first aspect of the present invention, the present invention includes a pump driven by an engine and a pump driven by an electric motor. Therefore, the engine driven pump can be downsized so as to prevent an excessive oil supply. When an amount of oil supplied by the engine driven pump is insufficient, a required amount of oil can be supplied by the motor driven pump. Further, it is possible to suppress the engine load and to improve fuel efficiency by downsizing the engine driven pump.

According to a second aspect of the present invention, the present invention includes an accumulator for accumulating oil discharged from the engine driven pump, and supplies oil in the accumulator through the motor driven pump. Since the motor driven pump is supplied oil accumulated at high pressure in the accumulator, the motor driven pump can introduce a sufficient amount of oil and the required amount of oil can be supplied through the motor driven pump even the motor driven pump has a low suction performance. Therefore, the motor driven pump can be downsized.

According to a third aspect of the present invention, in a case that a quick change of the transmission ratio is required, the accumulator supplies the accumulated oil through the motor driven pump.

According to a fourth aspect of the present invention, the motor driven pump is driven when a controller stops the engine. Therefore, the engine can be restarted when oil is supplied to the engine. For instance, it is possible to suppress a shock generated in the transmission because the engine can be restarted when the pressurized oil is supplied to an oil pressure control device of the automatic transmission. For instance, it is effective to drive the motor driven pump when the engine is temporarilys topped by an operation of an idle-stop control. Further, in a belt type continuously variable transmission, the motor driven pump is controlled to maintain a pressure that can hold the belt. Here, a delay time from a stopping of the engine to a starting of the motor driven pump is preferably set according to a characteristic for maintaining the oil pressure. The motor driven pump may be controlled according to the oil pressure. For instance, the pump is stopped when the oil pressure increases more than a predetermined value, and the pump is driven when the oil pressure decrease less than a predetermined value. For instance, an applied voltage is decreased when the oil pressure increases, and the applied voltage is increased when the oil pressure decreases.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 2A shows an idle operation, FIG. 2B shows a normal running operation, FIG. 2C shows an accumulating operation and FIG. 2D shows a releasing operation;

DETAILED DESCRIPTION OF PREFERRED EMBODIMENTS

Hereinafter, embodiments of the present invention will be described with reference to drawings.

First Embodiment

Figure 1:
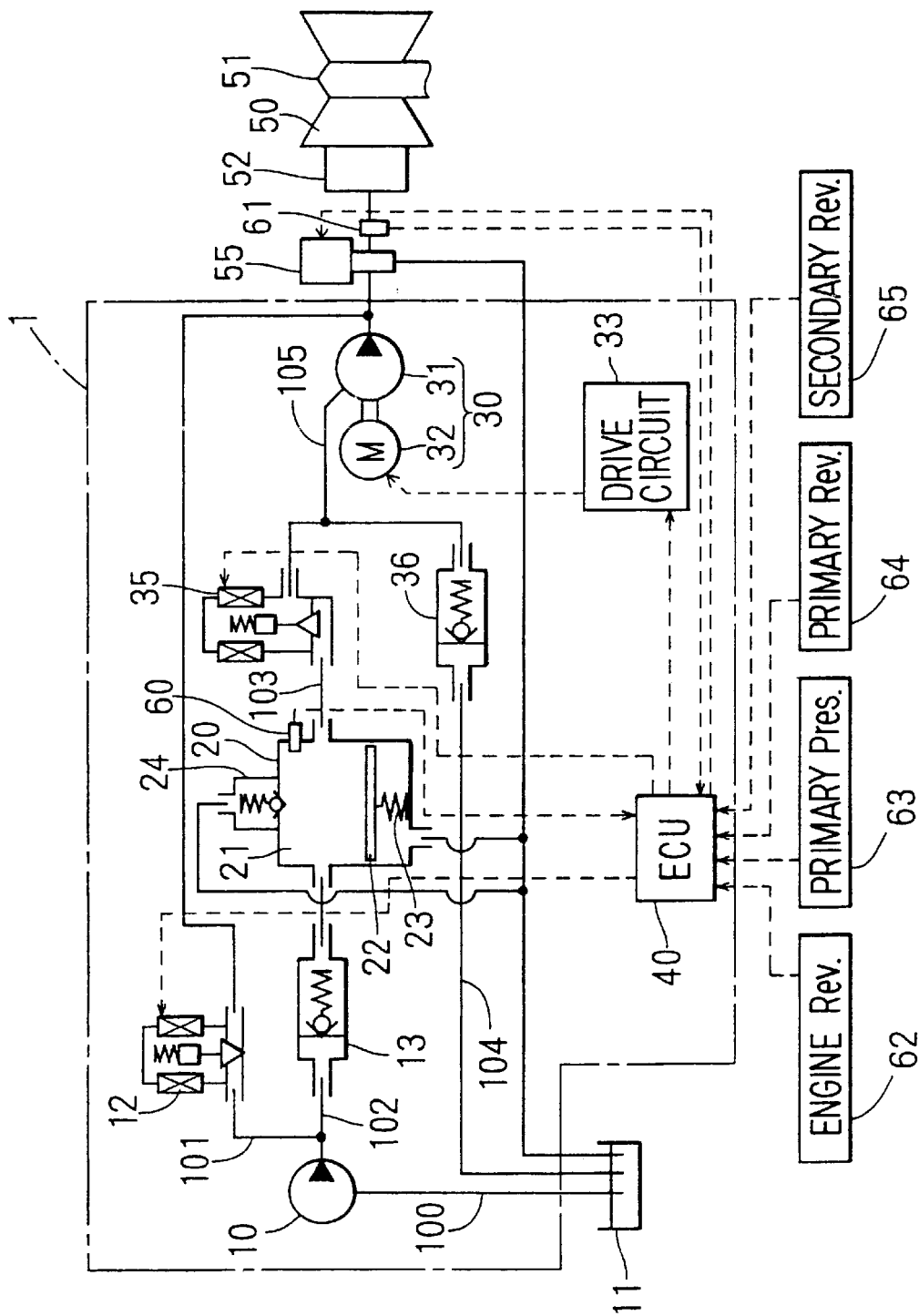
FIG. 1 is a schematic view of an oil supply system according to a first of the present invention.

FIG. 1 shows an oil supply system according to a first embodiment of the present invention. The oil supply system 1 constructs a part of a controller of an automatic transmission in which a transmission ratio can vary continuously. Such a continuously variable transmission has a secondary pulley 50 and an oil chamber 52 for the secondary. The system that supplies oil to the oil chamber 52 is shown in a figure. A pressure in a primary chamber of a primary pulley which is not shown is generated from the pressure in the secondary oil chamber 52.

The oil supply system 1 has an engine driven pump 10, an electromagnetic valve 12, an one-way valve 13, an accumulator 20, a motor driven pump 30, a driving circuit 33 and an engine control unit (ECU) 40 as a controller.

The engine driven pump 10 is driven by an engine output shaft which is not shown and is a pump for pressurizing oil. The engine driven pump 10 sucks oil from an oil tank 11 through an oil passage 100 and discharges oil into oil passages 101 and 102. The oil passage 101 constructs a first supply line. The electromagnetic valve 12 as a first electromagnetic valve opens and closes the oil passage 101 in response to a command signal form the ECU 40. The ECU 40 may be a single unit or a plurality of units. The engine driven pump supplies oil into the oil chamber 52 through the oil passage 101, when the electromagnetic valve 12 is opened. The one-way valve prevents that a reverse flow of oil in the accumulator 20 to the engine driven pump 10.

The accumulator 20 has a chamber 21. The chamber 21 accumulates oil discharged by the engine driven pump when the electromagnetic valve 12 is closed. The partition plate 22 urged by force of a spring 23 pressurizes oil in the chamber at a predetermined pressure. If accumulated oil in the chamber 21 reaches a predetermined amount, a pressure regulator valve 24 opens to return excessive oil to the oil tank 11. A sensor 60 as a detecting means detects an amount of oil in the chamber 21 and transmits a detected signal to the ECU 40.

The motor driven pump 30 has a main part 31 and a motor 32 for driving the main part 31. The motor driven pump 30 introduces oil from an oil passage 105 and discharges pressurized oil from the main part 31. A drive circuit 33 supplies driving current to the motor 32 in response to a command signal transmitted from the ECU 40 to the drive circuit 33. An electromagnetic valve 35 as a second electromagnetic valve is disposed on an oil passage 103 and opens and closes the oil passage 103 in response to a command signal from the ECU 40. The oil passages 102, 103 and 105 construct a third supply line.

When drive current is supplied from the drive circuit 33 to the motor 32, the main part 31 is driven. When the electromagnetic valve 35 is opened, the motor driven pump 30 introduces oil from the chamber 21. When the electromagnetic valve 35 is closed the motor driven pump 30 introduces oil from the oil tank 11 through the oil passages 104 and 105. The oil passages 104 and 105 construct a second supply line.

The secondary pulley 50 is a pulley for changing a transmitting ratio and for transmitting a driving force to driven wheels. A V-belt 51 connects the secondary pulley 50 and a primary pulley which is not shown. The secondary pulley 50 has a groove in which a width is varied according to a volume of the oil chamber 52. The primary pulley also has a groove in which a width can vary according to the volume of the primary oil chamber. As a result, diameters of the pulleys are changed and a ratio of the revolution speed between the primary pulley and the secondary pulley is changed. As a result, a control for varying the transmitting ratio continuously is implemented. An electromagnetic regulator valve 55 regulates the oil pressure in the oil chamber 52.

The ECU 40 inputs detection signals of sensors 60 to 65. The sensor 60 detects the amount of oil in the chamber 21. The sensor 61 detects an oil pressure in the oil chamber 52. The sensor 62 detects a revolution speed of the engine. The sensor 63 detects an oil pressure in the primary oil chamber. The sensor 64 detects a revolution speed of the primary pulley. The sensor 65 detects a revolution speed of the secondary pulley 50. The ECU 40 transmits command signals to the electromagnetic valves 12 and 35, the drive circuit 33, and the electromagnetic regulator valve 55.

Next, an operation of the oil supply system 1 will be described based on FIG. 2 through FIG. 6. The description is divided into (1) the revolution speed of the engine and (2) a changing speed of the transmission ratio. AS shown in FIG. 2, arrows indicate a flow of oil.

(1) The Revolution Speed of the Engine.

Figure 2A:
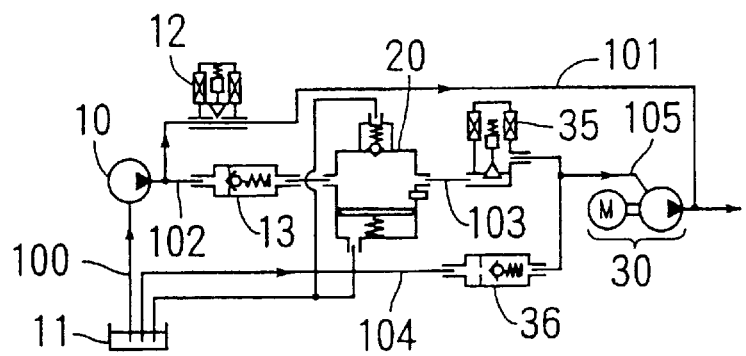
FIG. 2A through FIG. 2D are oil circuit diagrams showing operations of the first embodiment.

When the engine is in an idle operation, the engine runs under a low revolution state in which the revolution speed is less than a predetermined value. As shown in FIG. 2A, the electromagnetic valve 12 is opened and the electromagnetic valve 35 is closed in response to the command signals from the ECU 40. The motor driven pump 30 is driven under the command from the ECU 40. Therefore, the engine driven pump 10 introduces oil from the oil passage 100, the motor driven pump 30 introduces oil from the oil passages 104 and 105, and both the pump 10 and 30 supply oil to the oil chamber 52.

The ECU 40 stops the engine, when a vehicle is temporary stopped such as a waiting at a traffic signal and an idle operation in which the revolution speed of the engine is lower than a predetermined value is continued not less than a predetermined time. The ECU 40 acts as an idle-stop control means too. The ECU 40 discriminates the stoppage of the vehicle by detecting a condition in which the revolution speed is lower than a predetermined value and the condition is continued not less than a predetermined time. In this case, the ECU 40 automatically stops the engine without any operations by the driver.

After that, if the driver operates an accelerator pedal, the ECU 40 detects the operation of the accelerator pedal and resumes a fuel injection and an ignition. Therefore, the engine is restarted. During the idle-stop operation, oil leaks from the oil chamber 52 and the pressure of oil in the oil chamber 52 is decreased. If the oil pressure in the oil chamber 52 is decreased lower than a holding pressure, the secondary pulley 50 can't hold the V-belt 51. A primary pressure is also decreased, the primary pulley can't hold the V-belt 51 too. In this condition, if the engine is restarted, the V-belt 51 slips. And, a shock might be generated on the continuously variable transmission and the vehicle, because the vehicle is moved when a correct transmission ratio is not obtained between the secondary pulley 50 and the primary pulley. Additionally, the secondary pulley 50 and the primary pulley might be damaged. To avoid such a problem, the motor driven pump 30 is driven at the idle-stop operation and supply oil to the oil chamber 52.

Figure 3:
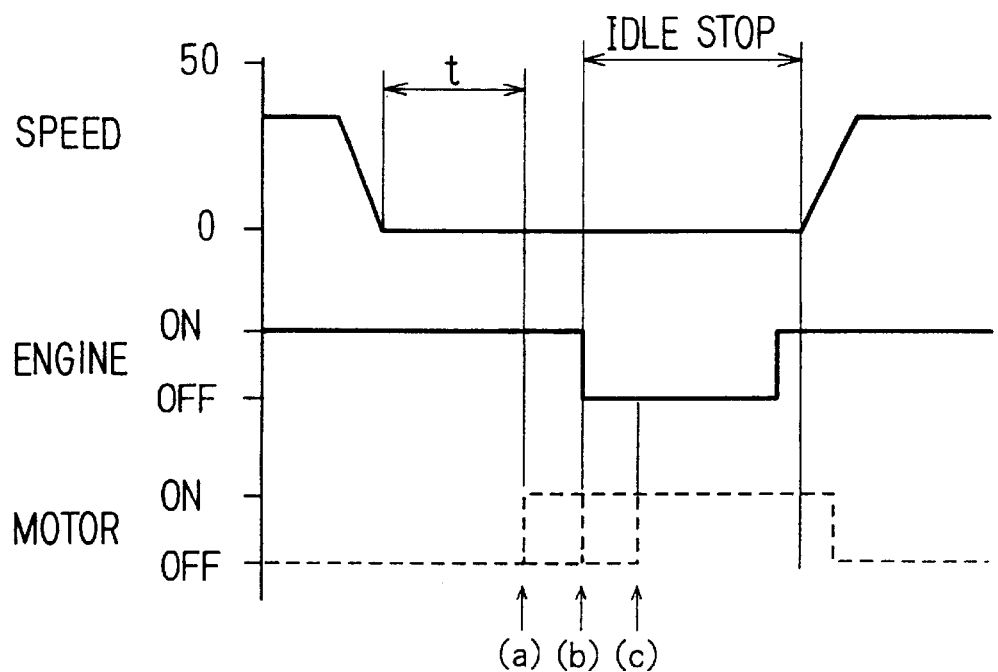
FIG. 3 is a time chart showing an operation of the first embodiment.

FIG. 3 shows timings (a), (b), and (c) for starting the motor driven pump 30 in the idle-stop operation. In FIG. 3, the motor driven pump 30 is maintained to be driven until an elapse of a predetermined time even the engine is restarted. Because the engine driven pump 10 can't supply a sufficient amount of oil to the oil chamber 52 until the revolution speed of the engine exceeds more than a predetermined value. That is similar to FIG. 4, FIG. 5, and FIG. 6. In the case of (a), the motor driven pump 30 is started before the engine is stopped. It is possible to supply oil into the oil chamber 52 by the motor driven pump 30 before the engine driven pump 10 is stopped, by starting the motor driven pump 30 before the engine is stopped. The pressure in the oil chamber 52 is maintained at the holding pressure, even if the motor driven pump 30 has a low performance of supplying oil. A delay time t is preferable to more than one second. This delay time avoids a driving of the motor driven pump 30 when the vehicle moves just after a stop. In the case of (b), the motor driven pump 30 is started simultaneously with the stoppage of the engine. In the case of (c), the motor driven pump 30 is started after an elapse of a predetermined time, e.g. after 0.5 seconds from the engine is stopped. The pressure in the oil chamber 52 is gradually decreased after a temporally increasing by closing the passage, even the oil chamber 52 is not supplied oil from the engine driven pump 10 since the engine is stopped. Therefore, it is possible to maintain the holding pressure in the oil chamber 52, even the motor driven pump 30 is started after an elapse of the predetermined time after the engine is stopped.

Figure 4:
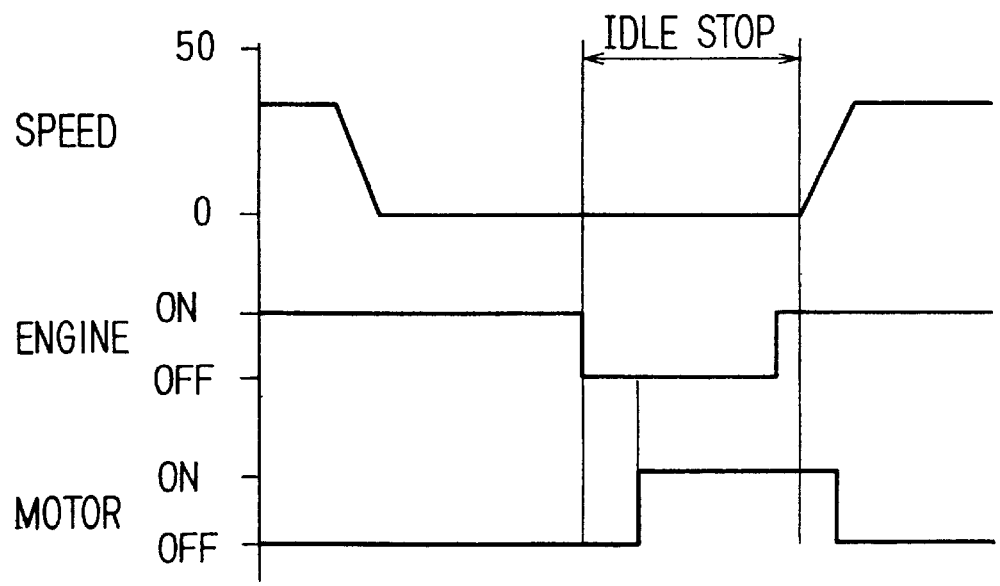
FIG. 4 is a time chart showing an operation of the first embodiment.
Figure 5:
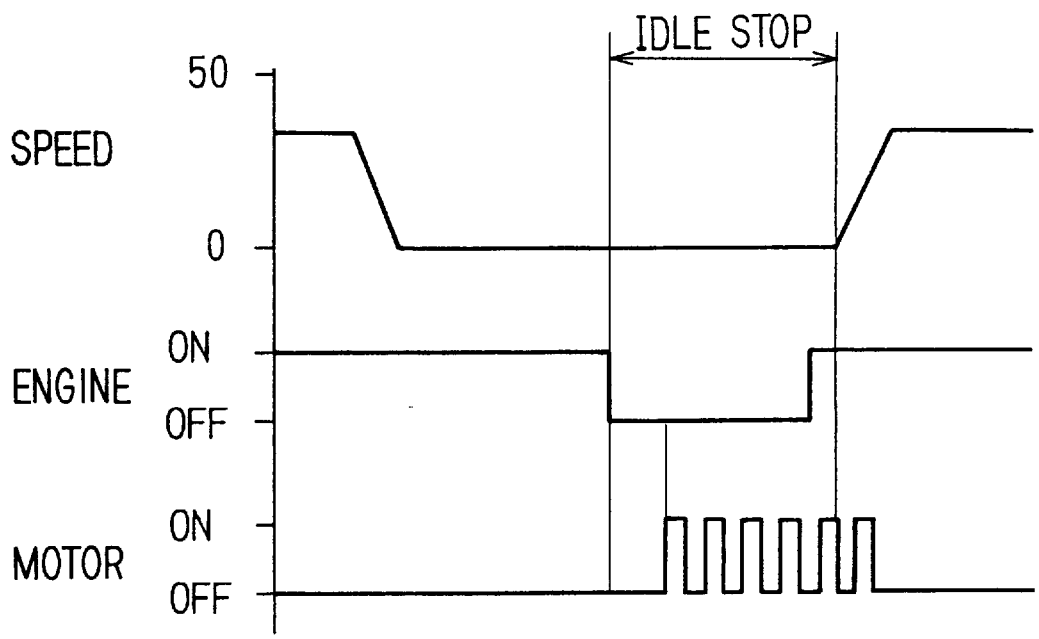
FIG. 5 is a time chart showing an operation of the first embodiment.
Figure 6:
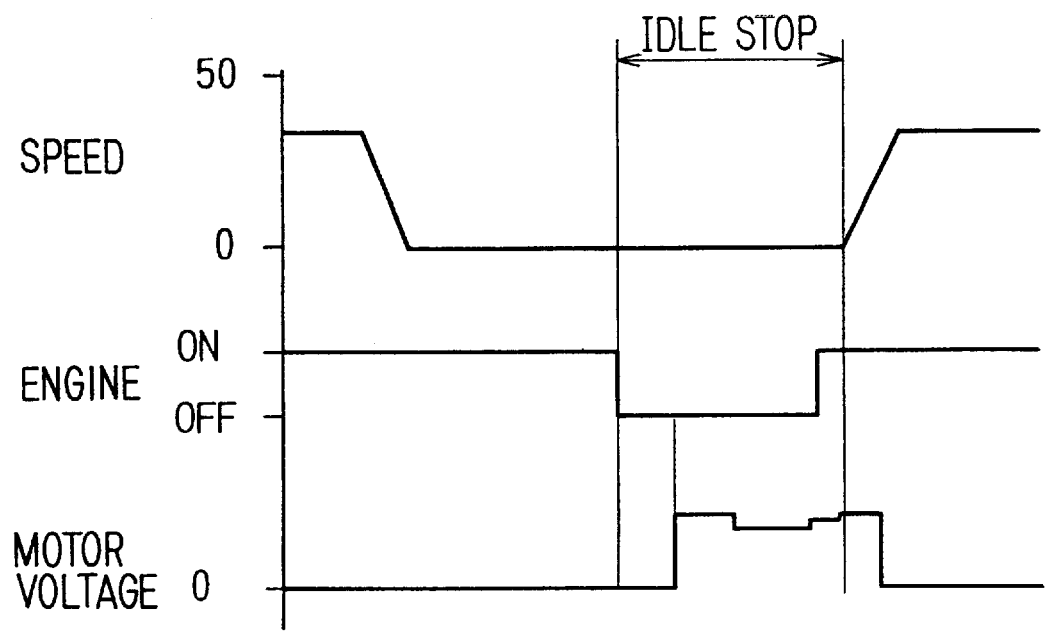
FIG. 6 is a time chart showing an operation of the first embodiment.

Next, a control of an applied voltage to the motor driven pump 30 during the idle-stop control will be described with reference to FIG. 4, FIG. 5, and FIG. 6. In FIGS. 4, 5, and 6, the motor driven pump 30 is started after an elapse of a predetermined time after the engine is stooped.

In the case of FIG. 4, a constant voltage is continuously applied. A voltage control is easy. The voltage may be maintained in a constant value during an ON period, and the constant value may be varied.

In the case of FIG. 5, the pressure in the oil chamber 52 is detected by the sensor 61, and a predetermined voltage is intermittently applied according to the detected pressure in the oil chamber 52. It is possible to be extended a life span of the motor driven pump 30, because a total driving time of the motor driven pump 30 can be shortened.

In the case of FIG. 6, the pressure in the oil chamber 52 is detected by the sensor 61, a voltage regulated according to the detected pressure of the oil chamber 52 is continuously applied. It is possible to be extended a life span of the motor driven pump 30, because an electricity consumption of the motor driven pump 30 is decreased rather than a constant voltage is applied.

Figure 2B:
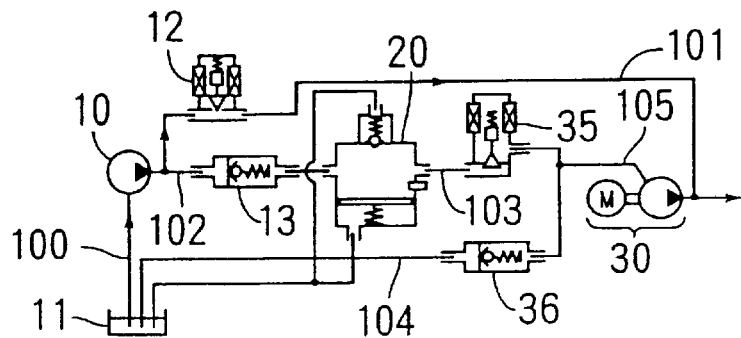

At a normal running condition when the engine revolution speed is not lower than a predetermined value, as shown in FIG. 2B, the electromagnetic valve 12 is opened and the electromagnetic valve 35 is closed in response to the command signal from the ECU 40. The motor driven pump 30 is not driven in response to the command signal from the ECU 40. Therefore, the engine driven pump 10 solely supplies oil to the oil chamber 52.

(2) The Changing Speed of the Transmission Ratio.

Figure 2C:
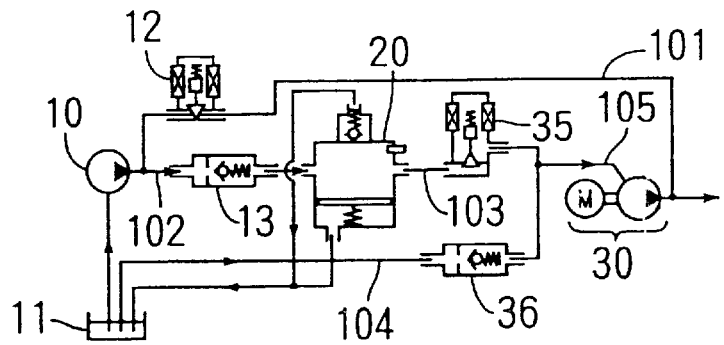

As shown in FIG. 2C, at an entire operation range in which the transmission ratio is not required to change quickly, if the ECU 40 discriminates that the amount of oil in the accumulator chamber 21 is less than a predetermined amount based on the detected signal from the sensor 60, the ECU 40 controls the electromagnetic valves 12 and 35 to be closed with no relation to the operation of the engine. Accordingly, the chamber 21 accumulates oil discharged from the engine driven pump 10 through the oil passage 102. When an accumulated amount of oil reaches a predetermined amount, the electromagnetic valve 12 is closed and an accumulation of oil in the chamber 21 is stopped.

Figure 2D:
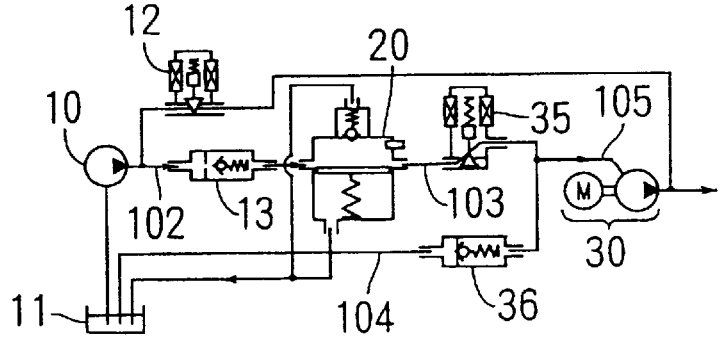

When a quickly change of the transmission ratio of the continuously variable transmission is required, it is needed to supply a predetermined amount of oil into the oil chamber 52 for a short time to change the groove width of the secondary pulley 50 quickly. It is difficult to supply the predetermined amount of oil into the oil chamber 52 for a short time by the engine driven pump 10 only. Therefore, as shown in FIG. 2D, the electromagnetic valve 12 is closed, the electromagnetic valve 35 is opened and the motor driven pump 30 is driven in response to the command signal from the ECU 40. Since the electromagnetic valve 1 is closed, the engine driven pump 10 doesn't supply oil into the oil chamber 52. The motor driven pump 30 introduces highly pressurized oil previously accumulated in the chamber 21, and supplies it into the oil chamber 52. Accordingly, it is possible to introduce a predetermined amount of oil and supply it into the oil chamber 52 in a short time.

In the first embodiment, the predetermined amount of oil is supplied into the oil chamber 52 in a short time by installing the chamber 21, and introducing oil accumulated in the chamber 21 into the motor driven pump 30. Therefore, it is possible to execute a changing operation of the transmission ratio quickly. Incidentally, when the continuously variable transmission is required a quick change, it is possible to supply a predetermined amount of oil in a short time even the motor driven pump 30 is a small size, because highly pressurized oil in the chamber 21 is supplied into the motor driven pump 30.

Second Embodiment

Figure 7:
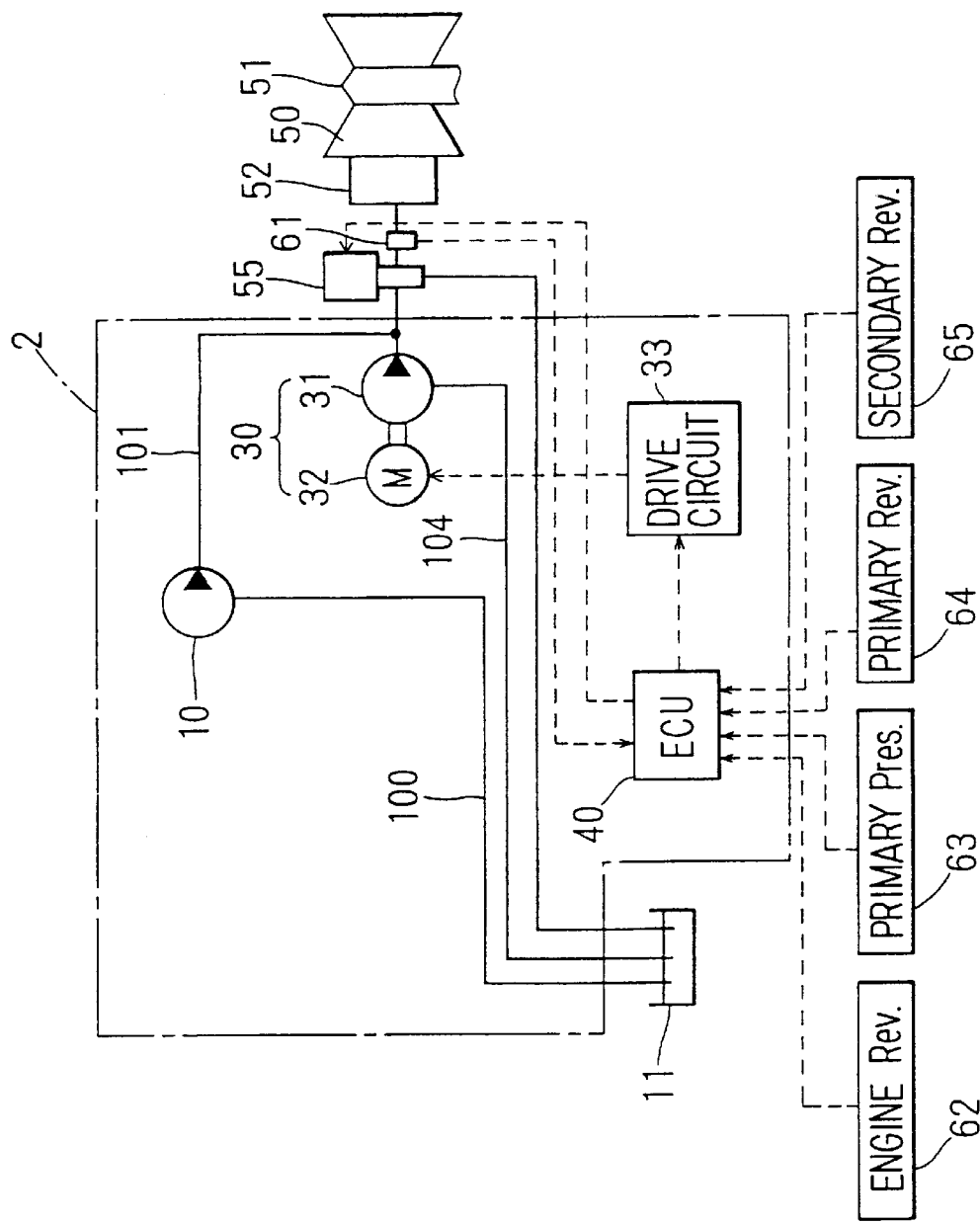
FIG. 7 is a schematic view of an oil supply system according to a second embodiment of the present invention.

FIG. 7 shows a second embodiment of the present invention. The same reference numerals are used for pointing components same as the first embodiment, and characterizing components of the second embodiment is explained. The start timing of the motor driven pump 30 and the control of voltage applied to the motor driven pump 30 are the same as that of the first embodiment. In a supply system of the second embodiment, the engine driven pump 10 and the motor driven pump 30 are arranged in parallel.

Third Embodiment

Figure 8:
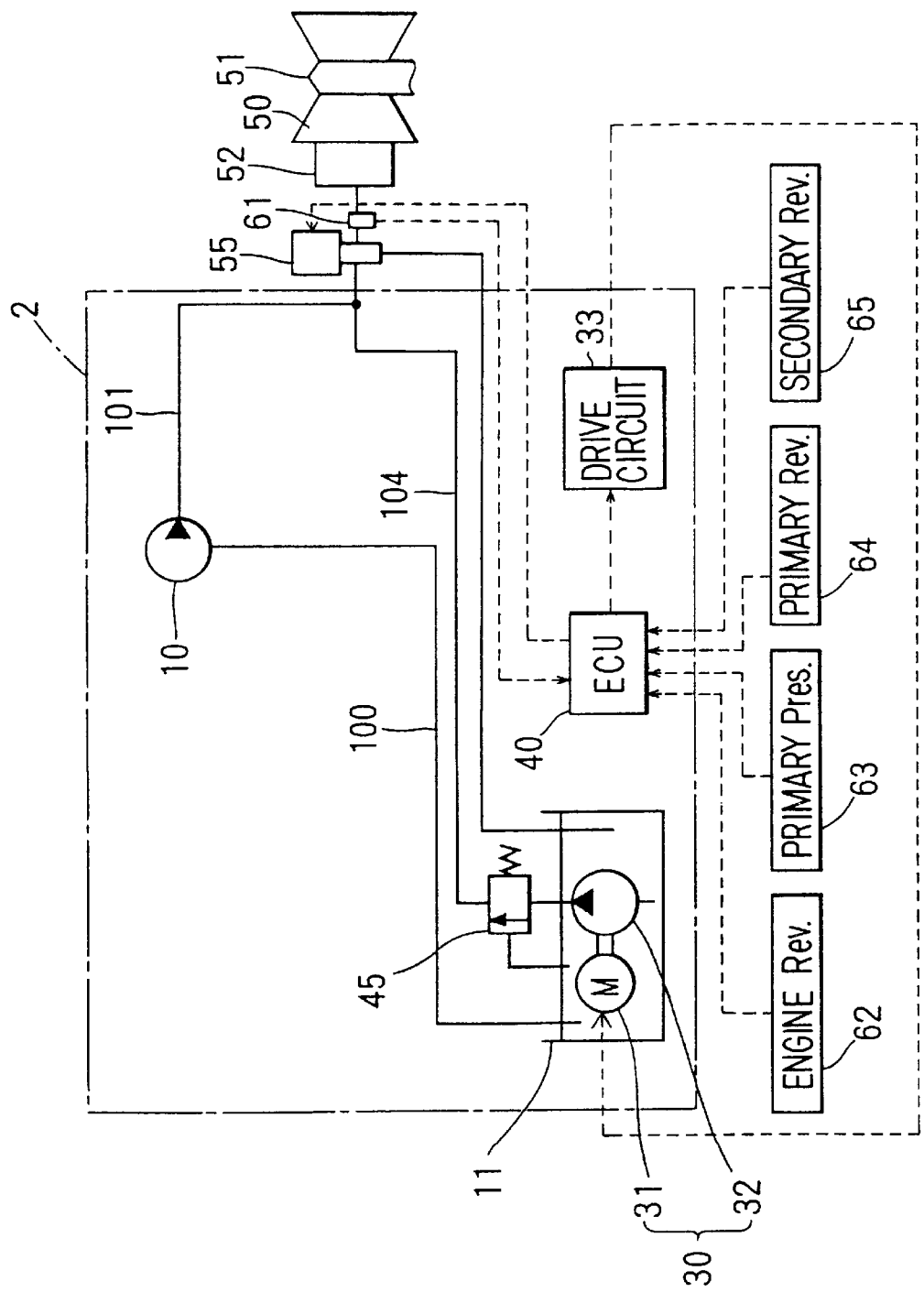
FIG. 8 is a schematic view of an oil supply system according to a third embodiment of the present invention.
Figure 9:
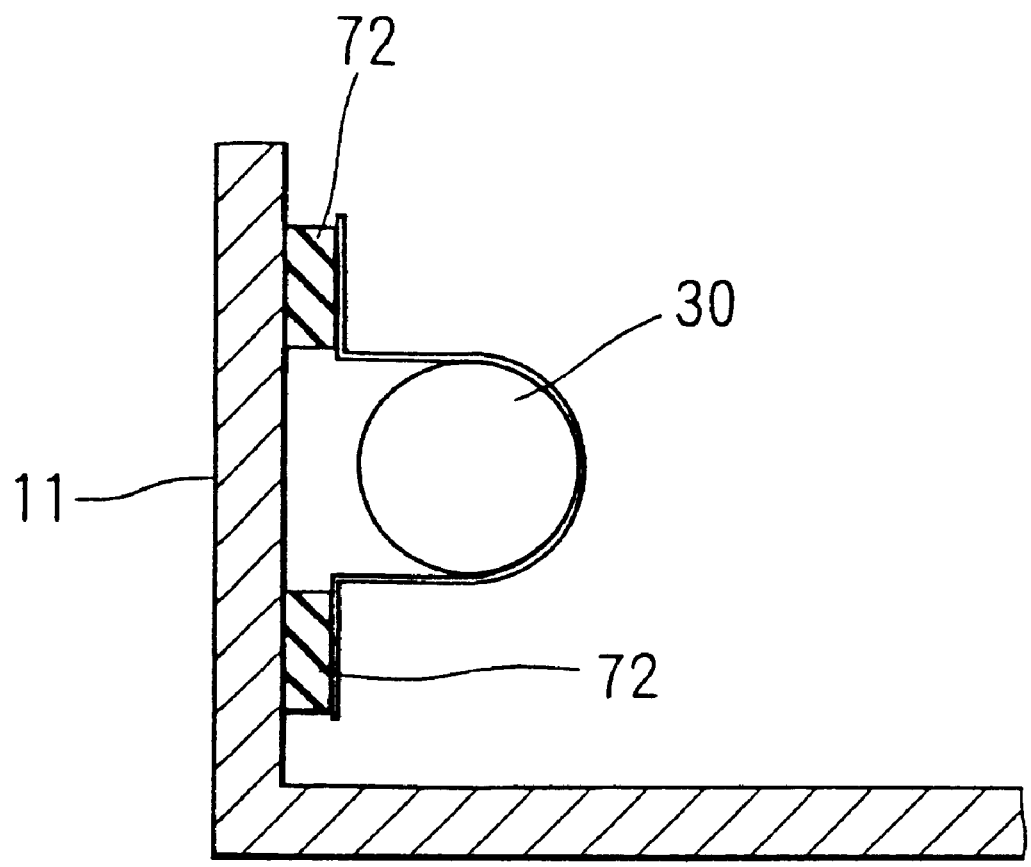
FIG. 9 is a simplified cross sectional view showing a supported condition of an electric motor driven pump according to the third embodiment of the present invention.

FIG. 8 and FIG. 9 show a third embodiment of the present invention. The motor driven pump 30 is disposed in the oil tank 11. The start timing of the motor driven pump 30 and the control of voltage applied to the motor driven pump 30 are the same as that of the second embodiment. A pump such as an impeller type or a scroll type which are operable in oil and emit low noise is used for the motor driven pump 30. For instance, a volute pump can be used.

As shown in FIG. 9, the motor driven pump 30 is supported on the sidewall of the oil tank liby a stay 71. A vibration proofing rubber 72 is disposed between the stay 71 and the oil tank 11. The vibration proofing rubber 72 suppresses vibration and noise. The vibration proofing rubber 72 may be disposed between the motor driven pump 30 and the stay 71. A pressure regulator 45 as a pressure regulating apparatus shown in FIG. 8 is arranged in a discharge side of the motor driven pump 30 for regulating a discharge pressure of the motor driven pump 30.

In this embodiment, since the motor driven pump 30 is disposed in the oil tank 11, a mounting space for the motor driven pump 30 is not needed. Therefore, a mounting space for the oil supply system is decreased. Further, since connections between the controller of the continuously variable transmission and the oil passages don't cause a leakage and an introducing of foreign substances, it is not necessary to seal up the connections of the oil passages. Therefore, an assembling time of the motor driven pump 30 is shortened.

Further, since a filter disposed in the oil tank 11 for removing a foreign substances in oil can be commonly used with the engine driven pump 10, number of parts can be decreased. Further, a pipe for connecting between the motor driven pump 30 and the controller of the continuously variable transmission is shortened. Since a pressure loss of oil supplied from the motor driven pump 30 to the controller of the continuously variable transmission is lowered, the system may use a motor driven pump having a low discharging performance. As a result, a compact motor driven pump may be used.

Further, the discharging pressure of the motor driven pump 30 can be easily adjusted in a required pressure of the continuously variable transmission by changing the pressure regulator. A manufacturing cost is decreased because the motor driven pump can be applied to a several kind of the automatic transmission controller including the controller of the continuously variable transmission.

In the above-described embodiments showing the preferred embodiments of the present invention, the system has the engine driven pump 10 and additionally has the motor driven pump 30. Therefore, at a low revolution speed, since the motor driven pump 30 can supplement oil, the engine driven pump 10 can be downsized to avoid that the engine driven pump 10 discharges an excess amount of oil at a high revolution speed. As a result, it is possible to supply a sufficient amount of oil to satisfy a demand.

Further, using a small size engine driven pump 10 decreases load applied to the engine and improves fuel efficiency. Further, it is possible to maintain the oil chamber 52 in the holding pressure by the motor driven pump 30 even the idle-stop control automatically executed is employed. Therefore, when the engine is restarted, since the primary pulley and the secondary pulley can provide an appropriate ratio, the vehicle can start without a generation of shock.

The present invention can be applied to the other apparatuses controlled by the pressurized oil such as a automatic transmission changing shift ranges in response to an option of a shift lever. Further, an exact amount of lubricating oil can be supplied by applying the present invention to a system supplying oil to a frictional portion.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An oil supply apparatus comprising:

an engine driven pump driven by an output shaft of an internal combustion engine;

a motor driven pump driven electrically and independently of the output shaft;

a controller for operating said motor driven pump; and a first supply line for supplying oil discharged from said engine driven pump, a second supply line for supplying oil discharged from said motor driven pump, a third supply line for supplying oil discharged by said engine driven pump to said motor driven pump, and an accumulator disposed in said third supply line to accumulate oil discharged by said engine driven pump and to supply accumulated oil to said motor driven pump.

2. An oil supplying apparatus according to claim 1, wherein:

said motor driven pump is operable in oil.

3. An oil supplying apparatus according to claim 2, wherein:

said motor driven pump is disposed in an oil tank and supplies oil to an automatic transmission.

4. An oil supplying apparatus according to claim 3, further comprising a pressure regulator for regulating a pressure of oil discharged from said motor driven pump.

5. An oil supply apparatus according to claim 1, further comprising a first electromagnetic valve for closing and opening said first supply line, a second electromagnetic valve for closing and opening an outlet side of said accumulator, and means for detecting an amount of oil accumulated in said accumulator and transmitting a detected signal to said controller, wherein said motor driven pump is arranged to supply oil to an automatic transmission, and wherein said controller closes both of said first and second electromagnetic valves when said amount of oil accumulated in said accumulator is less than a predetermined amount, and opens said second electromagnetic valve and drives said motor driven pump when said automatic transmission changes a ratio quickly.

6. An oil supplying apparatus according to claim 1, wherein said controller drives said motor driven pump when a revolution speed of said internal combustion engine is lower than a predetermined value.

7. An oil supply apparatus comprising:

an engine driven pump driven by an output shaft of an internal combustion engine;

a motor driven pump driven electrically and independently of the output shaft; and a controller for operating said motor driven pump, wherein said controller drives said motor driven pump when a revolution speed of said internal combustion engine is lower than a predetermined value, and wherein said controller stops said internal combustion engine when a condition in which said revolution speed of said internal combustion engine is lower than a predetermined value is continued not less than a predetermined time, and drives said motor driven pump during said internal combustion engine is stopped.

* * * * *